United States Patent [19]

Nash et al.

[11] Patent Number: 5,016,818
[45] Date of Patent: May 21, 1991

[54] INTEGRAL TRANSITION AND CONVERGENT SECTION EXHAUST NOZZLE

[75] Inventors: Dudley O. Nash, Cincinnati; David A. Nold, Lisbon, both of Ohio

[73] Assignee: General Electric Company, Cincinnati, Ohio

[21] Appl. No.: 396,399

[22] Filed: Aug. 21, 1989

[51] Int. Cl.⁵ .............................................. B64C 15/02
[52] U.S. Cl. ............................. 239/127.1; 239/265.19; 239/265.35; 239/265.37
[58] Field of Search ........... 239/127.1, 265.29, 265.33, 239/265.35, 265.37, 265.19; 60/226.2, 230

[56] References Cited

U.S. PATENT DOCUMENTS

| | | |
|---|---|---|
| 2,625,008 | 1/1953 | Crook . |
| 3,442,455 | 5/1969 | Smale . |
| 3,687,399 | 8/1972 | Tumavicus .......................... 244/55 |
| 3,690,561 | 9/1972 | Potter ............................ 239/265.29 |
| 3,837,579 | 9/1974 | Camboulives et al. ......... 239/265.39 |
| 4,098,076 | 7/1978 | Young et al. ......................... 60/230 |
| 4,375,276 | 3/1983 | Konarski ........................ 239/265.29 |
| 4,449,678 | 5/1984 | Hapke ........................ 239/265.33 X |
| 4,575,006 | 3/1986 | Madden ..................... 239/265.37 X |
| 4,690,329 | 9/1987 | Madden .......................... 239/265.19 |
| 4,714,197 | 12/1987 | Thayer et al. .................. 239/265.29 |
| 4,753,392 | 6/1988 | Thayer et al. ............. 239/265.33 X |
| 4,778,109 | 10/1988 | Jourdain et al. ................ 239/265.27 |
| 4,813,608 | 3/1989 | Holowach et al. ........ 239/265.39 X |

*Primary Examiner*—Andres Kashnikow
*Assistant Examiner*—William Grant
*Attorney, Agent, or Firm*—Jerome C. Squillaro

[57] ABSTRACT

A lightweight multifunction exhaust nozzle is designed with a specially contoured short length transition casing and a correspondingly contoured pair of convergent flaps. The change in flowpath section from circular to rectangular takes place partly within the transition casing and partly between the pair of convergent flaps such that the transition section of the exhaust nozzle is integrated with its convergent section. The convergent flaps are pivotally mounted in the exhaust nozzle so that exhaust gasses impacting the convergent flaps produce counteracting moments about a convergent flap shaft pivot axis thereby reducing the load on the convergent flap actuators.

18 Claims, 7 Drawing Sheets

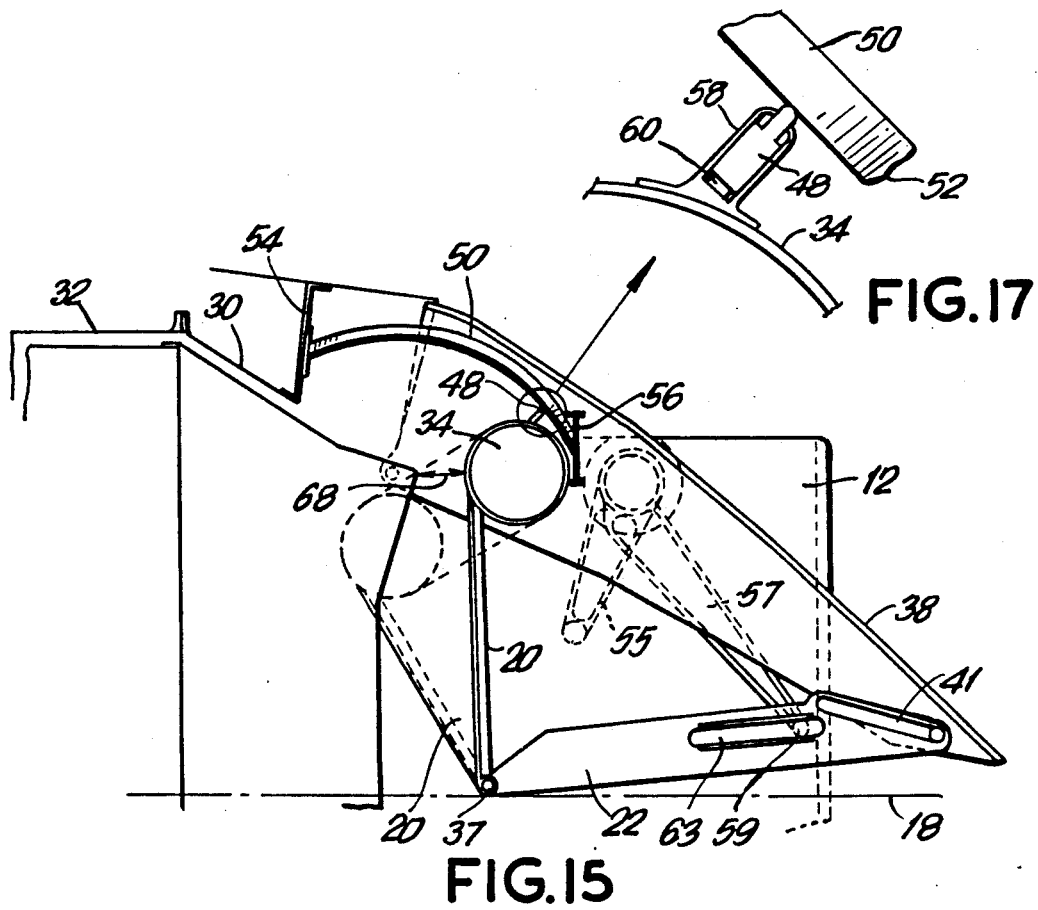
FIG.17
FIG.15
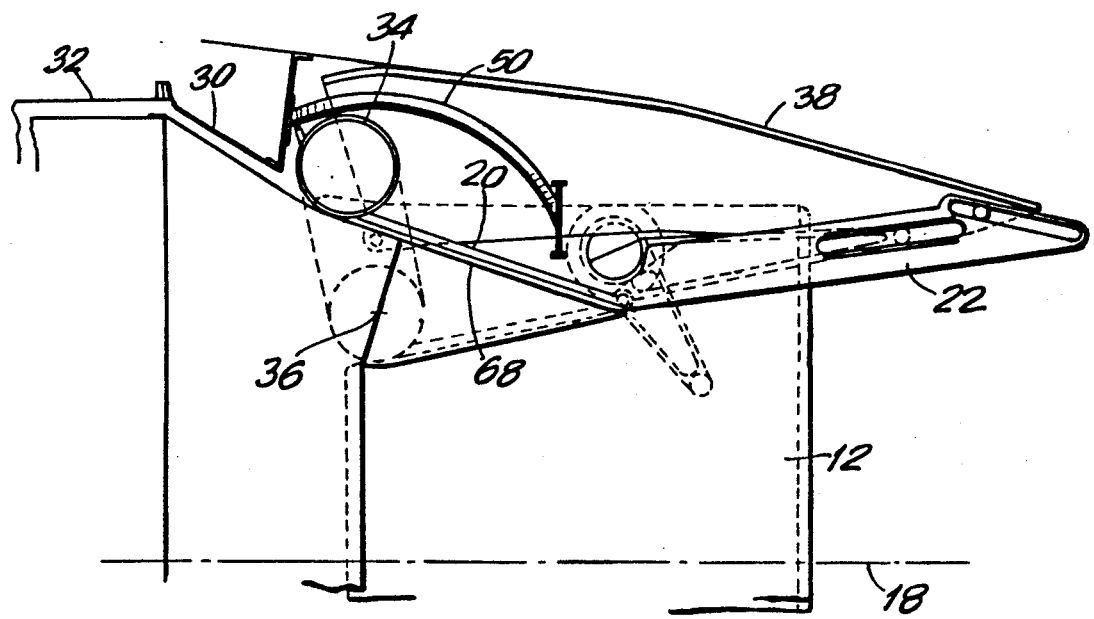
FIG.16

INTEGRAL TRANSITION AND CONVERGENT SECTION EXHAUST NOZZLE

BACKGROUND OF THE INVENTION

1. Field of the Invention

This invention generally concerns rectangular exhaust nozzles for turbojet aircraft engines and particularly concerns a compact and lightweight transition casing that interconnects a rectangular exhaust nozzle to a cylindrical engine casing.

2. Description of Prior Developments

The maneuverability of modern high performance turbojet aircraft is significantly enhanced by extending the capability of the engine exhaust nozzle beyond its conventional jet accelerating function to include a jet deflection capability. Jet deflection in the engine exhaust nozzle can produce more rapid aircraft maneuvers at lower flight speeds than can be achieved by conventional control surfaces. In addition, a reverse thrust capability incorporated with the exhaust nozzle can enable an aircraft to quickly decelerate on landing thereby reducing the landing roll distance for accommodating short landing field operation.

Exhaust nozzles capable of carrying out such additional functions are known as multifunction exhaust nozzles. A typical example of a conventional multifunction exhaust nozzle is schematically represented in FIGS. 1 through 6. Exhaust nozzles of the type shown in FIG. 1 which include a substantially rectangular cross section are often called two dimensional (2D) nozzles. These nozzles are preferred for multifunctional applications, since unlike round section, axisymmetric nozzles, the hinged flaps (10) may be differentially actuated as shown in FIG. 2, thereby deflecting the exhaust gas for rapid pitch maneuvering of the aircraft.

Exhaust nozzles for thrust augmented engines rely on the pivoting or rotation of hinged flaps (10) to selectively vary the cross sectional area of the nozzle as required. The 2D nozzles include four wide, substantially flat surfaces provided by two or more movable flaps (10) and two fixed sidewalls (12), as compared to 12 or more narrow flaps used on conventional axisymmetric nozzles. Even though the total flap surface area is similar for each type of nozzle, 2D nozzles tend to weigh more than axisymmetric nozzles.

During normal cruising conditions, the flaps 10 are oriented symmetrically as seen in FIG. 3. Unlike axisymmetric nozzles, the flaps (10) operating between the two fixed sidewalls (12) may be closed, as shown in FIG. 4. This blocks the flow of exhaust gas so that the gas is discharged through auxiliary exhaust nozzles (14) directed in a forward direction to produce reverse thrust.

While the performance benefits of 2D nozzles are significant, 2D nozzles have consistently weighed more than conventional axisymmetric nozzles. Because of this inherent drawback in weight, the full performance potential of 2D nozzles has not heretofore been realized. Reducing the weight differential between axisymmetric (circular section) and 2D nozzles is therefore most desirable for improved aircraft propulsion design.

A major factor in the excess weight of a 2D nozzle over an axisymmetric nozzle is the weight of the 2D nozzle transition casing. The transition casing, which is circular in section at its forward end, uniformly changes to a rectangular section at its aft end. In light of this change in flow path configuration, sections through the transition casing of a 2D nozzle are generally non-circular and thus, the internal gas pressure loading cannot be reacted in simple, efficient tension loading as can an axisymmetric nozzle casing.

In contrast to a rectangular casing, a cylindrical casing, as used with an axisymmetric nozzle, can be of very light construction with few, if any, ribs due to its uncomplicated symmetrical load distribution. The transition casing of a 2D nozzle, by comparison, requires numerous ribs supporting a relatively thicker duct skin as necessary to react the panel bending moments resulting from the non-circular casing contour. The difference in the structural handling of internal pressure forces, i.e. simple hoop tension in the case of a cylindrical casing compared to flexure loading within a 2D transition casing, is the basic cause of the large weight difference between axisymmetric and 2D nozzles.

Another drawback associated with 2D nozzles is their inherent aerodynamic incompatibility with single engine aircraft applications. Although the characteristic rectangular cross section of typical 2D nozzles can be smoothly integrated into the contours of twin engine aircraft, in the case of single engine aircraft having generally circular fuselage cross sections, the two dimensional nozzle with its rectangular cross section cannot be readily blended with the arcuate fuselage contours to produce a low drag afterbody. In view of the flight maneuverablity and other benefits of 2D nozzles, a need exists for an improved lightweight transition casing design which is generally compatible with single engine aircraft contours.

SUMMARY OF THE INVENTION

The present invention has been developed to fulfill the needs noted above and therefore has as a primary object the provision of a lightweight 2D transition casing for a jet engine exhaust nozzle.

Another object is to reduce the actuation force required to move a convergent flap against the counter force of flowing exhaust gasses.

Still another object is to improve the installation contour compatability of a 2D transition casing with the contours of single engine aircraft.

Yet another object is to effectively cool the convergent and divergent nozzle flaps via a sealed coolant distribution system.

These and other objects are met with the present invention which provides convergent flaps which are contoured so that a portion of the circular-to-rectangular flowpath transition takes place in the convergent nozzle, thus reducing the transition case length required upstream of the nozzle and correspondingly reducing the transition case weight. The external nozzle contour blends rearwardly from round to polygonal to rectangular at the tip of the outer flap, thus providing a continuous contour particularly well adapted to single engine installations, although also advantageous for twin engine installation. The nozzle area actuating force and power requirements are reduced by a counter balancing moment that arises out of the contoured convergent flap geometry.

The weight, load deflection, and surface contour distortion of the critical pressure balance cavity shroud is controlled by a sandwich panel construction with rigidizing beams. Pressure balance cavity leakage is controlled by a high excursion seal mounted on the convergent flap shaft for engaging the surface of the pressure balance cavity shroud. The high excursion seal conforms to shroud deflections and is produced of carbon-carbon composite material for low friction, long wear life, low weight, and conformability.

Hollow convergent flap shafts serve as coolant plenums to supply coolant to the convergent and divergent flaps at all nozzle flap positions.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIGS. 9, 10 and 11 are schematic axial sectional views depicting exhaust nozzle flap motion of the present invention wherein FIG. 9 depicts a maximum thrust configuration, FIG. 10 depicts a normal cruising configuration, and FIG. 11 depicts a flow diverting configuration for reversed thrust or lift jet operations;

FIGS. 15 and 16 are axial sectional views of a two dimensional exhaust nozzle according to the invention detailing the interconnection of the flaps and further depicting the details of the leakage control seal and seal shroud;

FIG. 17 is an enlarged cross sectional view detailing the leakage control seal of the present invention shown in FIG. 16.

In the various figures of the drawings, like reference characters designate like parts.

DETAILED DESCRIPTION OF THE PREFERRED EMBODIMENTS

Figure 1:
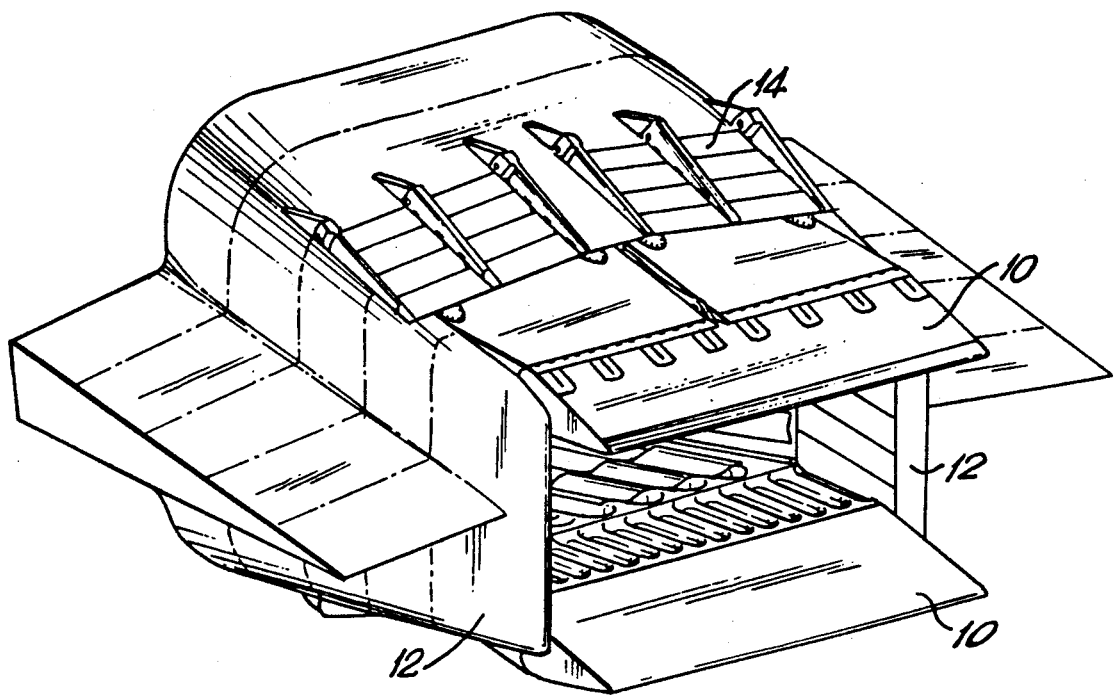
FIG. 1 is a perspective view of a two dimensional multifunction exhaust nozzle according to the prior art.
Figure 2:
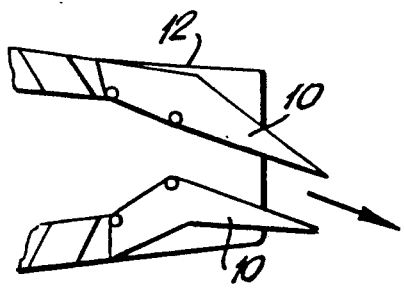
FIG. 2 is a schematic view of a prior art two dimensional exhaust nozzle differentially actuated to deflect exhaust gas downwardly.
Figure 3:
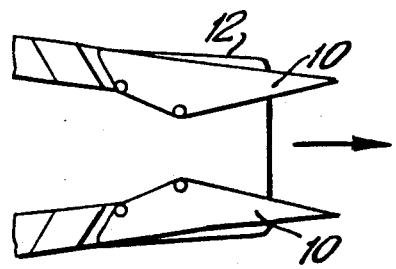
FIG. 3 is a schematic view of the two dimensional exhaust nozzle of FIG. 2 actuated for cruising operation.
Figure 4:
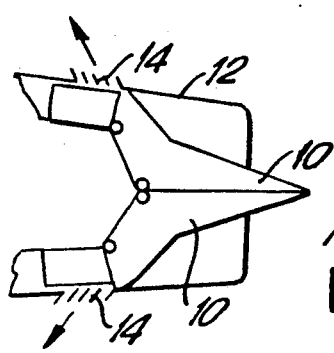
FIG. 4 is a schematic view of the two dimensional nozzle of FIG. 2 actuated to produce reverse thrust by diverting the flow through auxiliary exhaust nozzles.
Figure 6:
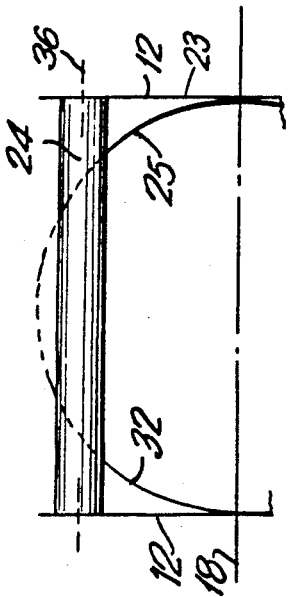
FIG. 6 is a schematic view of the superposition of sections A—A and B—B of FIG. 5.
Figure 5:
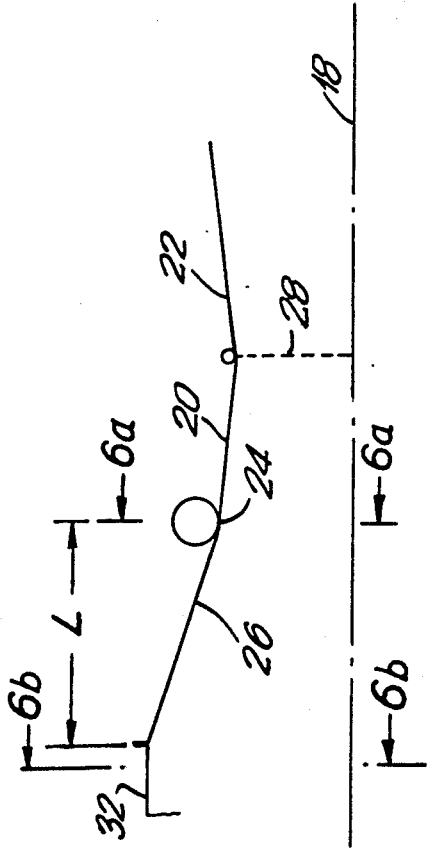
FIG. 5 is a schematic longitudinal sectional view of a two dimensional exhaust nozzle according to the prior art.

Conventional two dimensional exhaust nozzles have typically been based on a flow path layout as shown in FIGS. 5 and 6. The schematic flow path layout is shown taken about centerline 18 and for simplicity, depicts only the upper half of the symmetric flow path. Convergent flaps (20) and divergent flaps (22) are formed as flat planar members.

Figure 8:
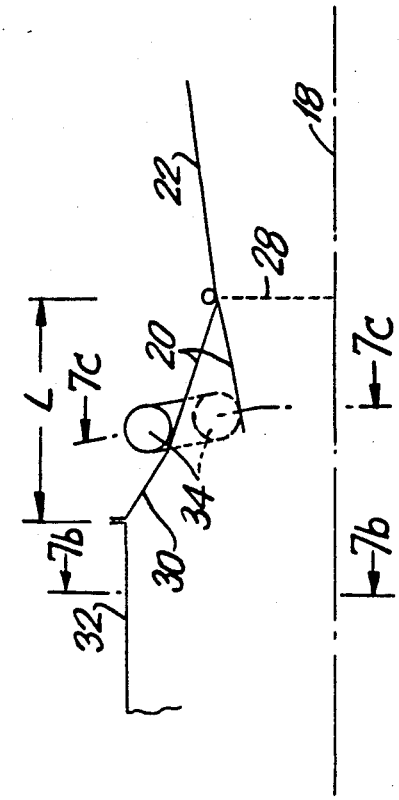
FIG. 8 is a longitudinal sectional schematic view of a short length two dimensional exhaust nozzle according to the present invention.
Figure 7:
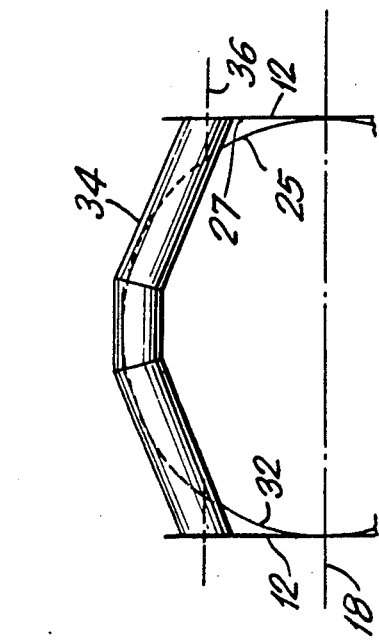
FIG. 7 is a schematic view of the superposition of sections B—B and C—C of FIG. 8.

The nomenclature used in the specification to denote lines through which cross section views are taken consist of a number and a letter, because, FIGS. 6 and 7 show two cross sections from each of FIGS. 5 and 8 respectively superimposed on each other from the same view point ut at different axial locations along centerline (18). The convergent flow path cross section (23) taken through line 6a—6a of FIG. 5 at the convergent flap hinge (24) is rectangular, while section 25 taken through line 6b—6b of exhaust casing (32) is circular as can be seen in FIG. 6 where they are superimposed on each other in a cross sectional view taken t line 6a—6a from a position of aft facing forward.

This mismatch necessitates the interposition of a transition duct (26) of sufficient length L between sections 6a—6a and 6b—6b to allow for an internal flow path geometry that is continuous and which limits changes in flow angle to values gradual enough to assure that flow separation from the nozzle walls and consequent turbulence will not occur. Such separation and turbulence is unacceptable since it would reduce the nozzle's efficiency and destroy the film cooling effectiveness upon which the metal walls depend for protection from the hot flowing propulsion gas.

As noted previously, such a long transition casing, due to its flexural, non-hoop tension loading, must be constructed of thicker material which is well reinforced with ribs in order to contain the pressurized exhaust gas. This structural reinforcement is a major source of the weight problem encountered with conventional two dimensional nozzles.

FIGS. 7 and 8 schematically show the upper half of a transition casing flow path design for a rectangular section 2D nozzle which eliminates excessive transition casing weight. It is understood that the term "2D" as used herein, as well as the term "rectangular" is intended to mean near rectangular or substantially rectangular and that a 2D nozzle is intended to produce substantially 2D flow, but not necessarily 100% 2D flow. A similar flow path design to that of FIGS. 7 and 8 is provided on the lower half of the flow path (not shown).

A comparison of the conventional flow path design of FIG. 5 with the improved flow path design of FIG. 8 will reveal that in the present invention, approximately the same axial transition length L is used as in conventional designs for undisturbed internal flow. A given transition length L is required to provide sufficient time for the fuel to adequately burn prior to discharge from the nozzle.

Although the overall length of the exhaust nozzles of FIGS. 5 and 8 is substantially the same, the axial length of the transition casing of FIG. 8 may be reduced compared to FIG. 5 and a much lighter and lower cost material may be used downstream of the short length transition casing so as to reduce the overall weight of the nozzle while providing an equivalent nozzle length. That is, the short length fixed portion of the transition casing (30) is formed with a relatively thick material to provide the necessary reinforcement and strength for reacting the forces of the exhaust gas. However, the material of the convergent flaps (20) and the nozzle casing and walls adjacent and downstream of the convergent flaps may be formed of light weight material, rather than heavy transition casing material as used in prior designs.

An important feature of the design of the present invention is the termination of the internal flow path transition at the nozzle throat (28) rather than at the convergent flap hinge (24). The transition in FIG. 8 takes place partly in the contoured convergent nozzle flap (20) and partly through a much shorter reinforced portion of the lower weight transition casing (30), which attaches to the cylindrical engine exhaust casing (32). Transition casing (30) has a circular section at its forward end adjacent the cylindrical exhaust casing (32) and a non-rectangular polygonal section at its aft end adjacent the convergent flap (20).

This modified transition is accomplished by contouring the convergent flap (20) and its support shaft (34) as shown in FIGS. 7 through 16. The forward portion of the convergent flap (20), together with sidewalls (12) and a bottom convergent flap shaft (20) (not shown) define a non-rectangular polygonal flow path section adjacent the aft portion of the transition casing (30). The sections through the aft end of the transition casing (30) and the forward portion of the convergent flap (20) are closely matched to provide a substantially continuous flow path transition. This design provides for an integration of the transition section of the nozzle with its convergent section through the use of a dual function convergent flap which functions in part as a transition casing member.

Figure 14:
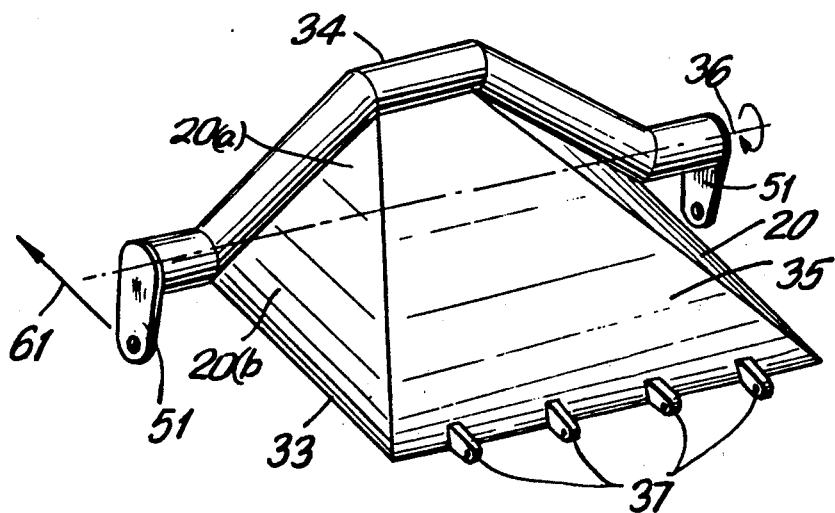
FIG. 14 is a perspective view of one of a pair of convergent flaps incorporated within the nozzle of the present invention.

It should be noted from a review of FIGS. 6, 7 and 14 that the flap shaft (34), which is analogous in function to flap hinge (24), is not straight as is flap hinge (24) but is non-linear with a central portion formed as an arch. This arched contour of the flap shaft (34) and corresponding contour on convergent flap (20) provide for a flowpath contour (27) taken through line 7c—7c in FIG. 8 that better approximates the cylindrical duct contour along section 7b—7b of the engine exhaust casing (32). This improved flowpath conformance of sections 7c—7c and 7b—7b over sections 6a—6a and 6b—6b, as best appreciated from a comparison of FIGS. 6 and 7, in turn allows the use of an axially short, low weight transition case.

Figure 9:
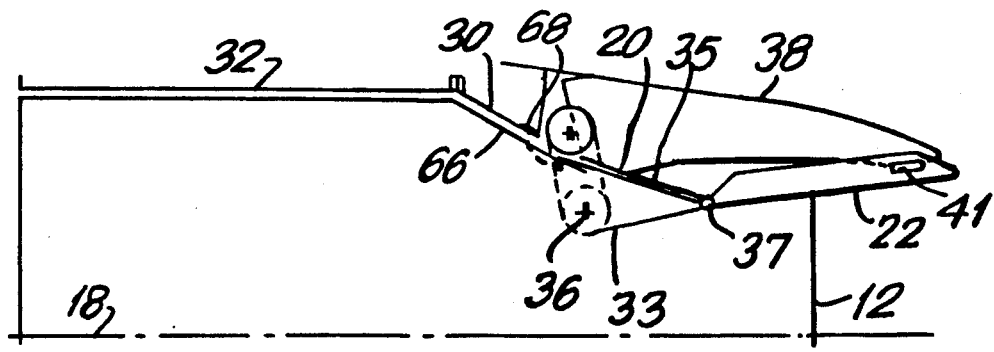
Figure 10:
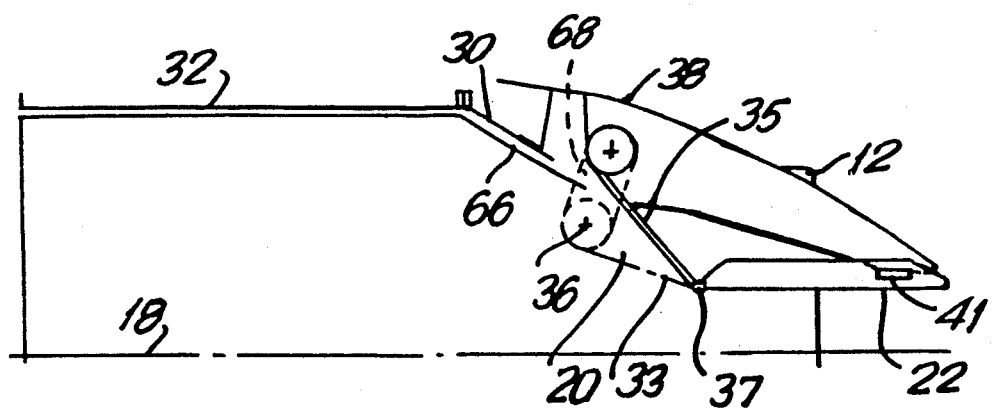
Figure 11:
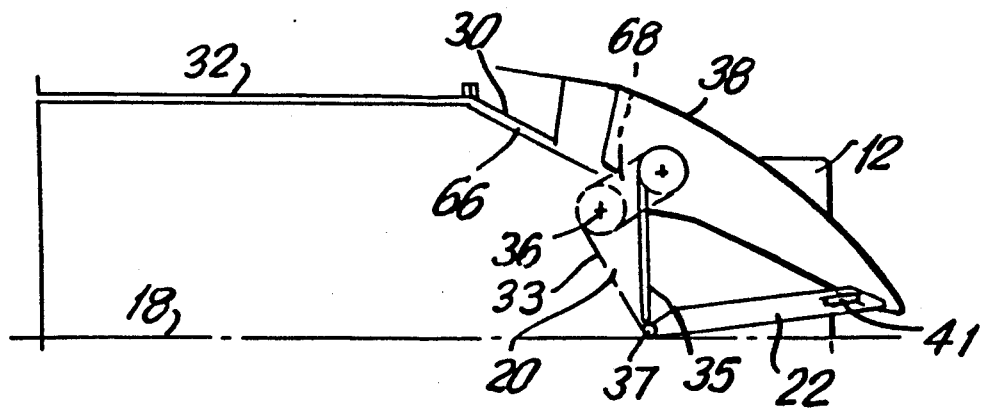

FIGS. 9 through 11 show the motion of the upper nozzle flaps as the upper convergent flap (20) is rotated about its axis (36) during multifunction operation. The bottom edge (33) of convergent flap (20) as well as the central portion (35) of convergent flap (20) are profiled in three separate positions in FIGS. 9, 10 and 11. Also shown in these Figures are the corresponding positions of divergent flap (22) and outer flap (38).

In FIG. 9, the nozzle is opened wide for maximum thrust while FIG. 10 represents the position of the nozzle during normal cruising operation and FIG. 11 shows the nozzle in its flow diverting position for reverse thrust or lift jet operation. The relative movements of the convergent flap (20), divergent flap (22) and outer flap (38) are coordinated through a linkage system described below. A simplified representation of this linkage is seen in FIGS. 9 through 11 wherein divergent flap (22) coordinates movement between convergent flap (20) and outer flap (38) via pivot joint (37) and sliding pinned joint (41).

Figure 12:
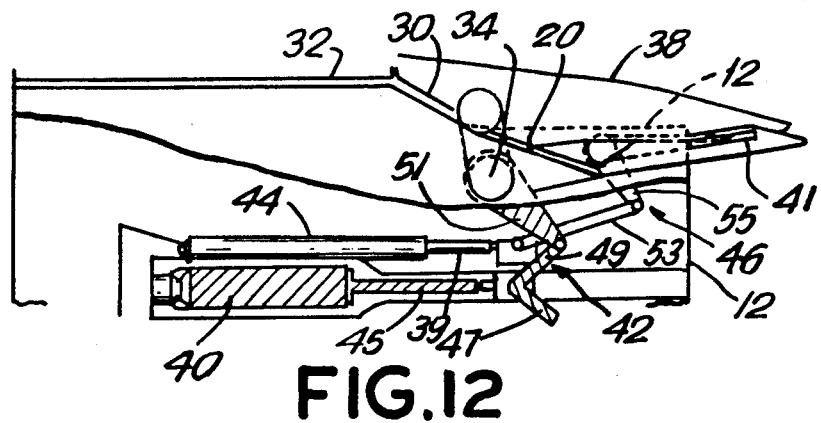
FIG. 12 is a schematic axial sectional view of the variable area two dimensional exhaust nozzle according to the present invention showing the flap actuators and the linkages interconnecting the actuators with the flaps.

FIG. 12 details the nozzle flap actuation mechanisms. A convergent nozzle flap actuator (40) is connected to a convergent nozzle linkage (42) and a divergent nozzle flap actuator (44) is connected to a divergent nozzle linkage (46). Actuator (40) may take the form of a hydraulic piston having a shaft (45) connected to pivoting links (47) and (49) of linkage (42).

Link (49) is pivotally connected to flap pivot arm (51) while link (47) is similarly connected to a corresponding flap lever arm on the lower convergent flap (20) (not shown). The divergent flap actuator (44) may also take the form of a hydraulic piston having a shaft (39) connected to one end of pivot link (53). The other end of pivot link (53) is pivotally connected to pivot arm (55) which is mounted to sidewall (12).

Figure 13:
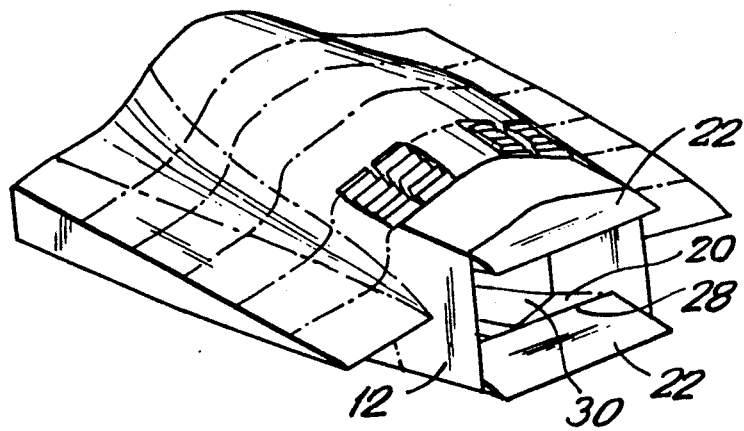
FIG. 13 is a perspective view of a smoothly contoured two dimensional exhaust nozzle according to the present invention.

The relative location and arrangement of the contoured convergent flap (20) with respect to the overall nozzle configuration is shown in FIG. 13. The convergent flap (20) is further shown with its shaft (34) in FIG. 14 in a pictorial perspective view for clarity. The scoop-shaped, three-sided convergent flap (20) is rigidly connected to shaft (34) so that an outer flap portion (20a) extends radially outwardly from flap shaft pivot axis (36) and an inner flap portion (20b) extends radially inwardly from the flap shaft axis. Directional arrow (61) indicates the direction in which actuation force is applied by actuator (40).

FIGS. 15 and 16 respectively show the nozzle in its flow diverting position and its maximum thrust position. These positions are the extremes of flap motion. The coordination of movement between the convergent flap (20), divergent flap (22) and outer flap (38) is best appreciated from a comparison of FIGS. 15 and 16. As the divergent flap actuator (44) (FIG. 12) rotates pivot arm (55) via pivot link (53), a second pivot arm (57), which is connected to a slot (63) in the divergent flap (22) via sliding pinned joint (59), causes the divergent flap to rotate about pivot joint (37).

A flap hinge leakage control seal (48) is attached to shaft (34) and engages a seal shroud (50) which is contoured to the shape of shaft (34) to effectively seal against loss of propulsion gas. In view of the high pressure loading on seal shroud (50) and the importance of a smooth inner surface for intimate seal engagement, the shroud is of a sandwich panel construction (52) as seen in FIG. 17 and is supported at its aft and forward edges by support beams (54) and (56), respectively. The support beams (54, 56) are in turn rigidly fixed to the stationary side walls (12) of the nozzle.

Shroud (50) as well as beams (54) and (56) span the full width of the nozzle, 30 inches or more on a typical engine. Elastic deflection of these members under pressure loading can be as much as ¼ to ½ inch. To accommodate such deflections, seal (48), a high excursion seal, is capable of following the deflections of arcuate shroud (50) thereby assuring effective leakage control.

As seen in FIG. 17, the seal (48) is guided by seal retainer (58) and preloaded and biased outwardly by leaf spring (60). Seal (48) is of a carbon-carbon composite construction. This composite material provides a unique combination of low friction, long wear life, low weight, and conformability.

The contoured shaft (34) with mating seal shroud (50) provides an additional benefit in terms of reduced nozzle flap air load moment which directly leads to reduced actuation force required of convergent flap actuator (44) (FIG. 12). This reduction in actuation force is diagramatically depicted in FIGS. 18, 19, 20 and 21 which show, for both the conventional (flat) flap and the contoured flap of the invention, the effect on air load moment and the directly related force required to actuate the flaps for nozzle area variation.

Figure 18:
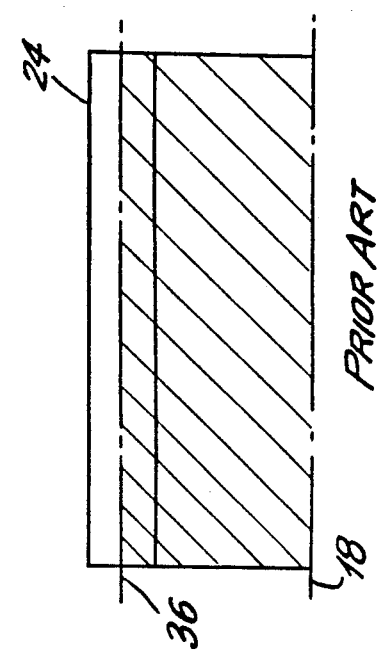
FIG. 18 is a schematic view of a prior art exhaust nozzle flat convergent flap design.
Figure 19:
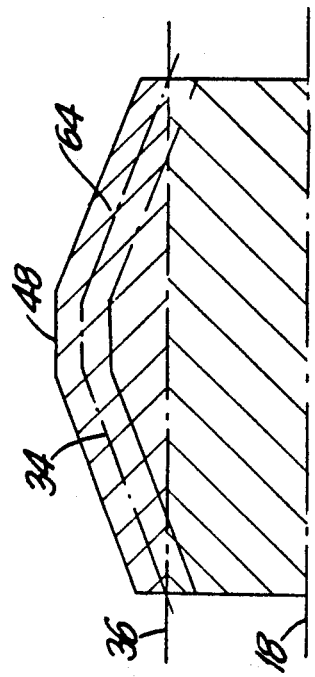
FIG. 19 is a graphic representation of a pressure load area of the long conventional flat convergent flap of FIG. 18.
Figure 20:
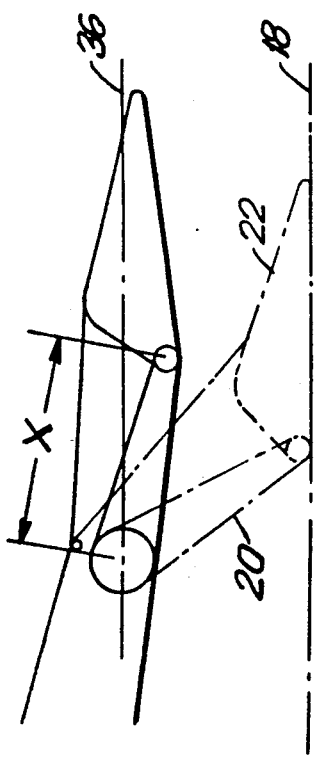
FIG. 20 is a schematic view of the contoured convergent flap of the present invention depicted in an open and a closed position analogous to those positions shown in FIG. 18.
Figure 21:
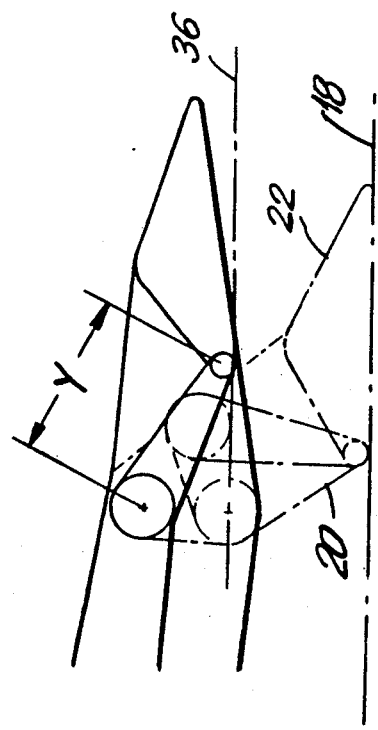
FIG. 21 is a graphic representation of the pressure load area of the short contoured convergent flap of FIG. 20 and further depicting a pressure balancing area which reduces the air load moment.

In FIGS. 19 and 21, the shaded areas represent the pressure loaded areas acting about axis (36). These areas represent the loads to be overcome by the convergent flap actuators (40). In FIG. 21, the convergent flap shaft axis (36) is positioned closer to engine centerline (18) than in FIG. 19. This closer positioning of the convergent flap shaft axis (36) reduces not only the loaded area but the moment arm as well, resulting in a large reduction in flap actuation force. The reduction in the moment arm is made possible by reducing the length X of conventional flap (20) in FIG. 18 to a shorter length Y according to the invention as shown in FIG. 20.

FIG. 21 shows a trapezoid shaped shaded area (64) located above the axis (36). Area (64), which is a projection of flap portion (20a) (FIG. 14) has as its upper boundary the seal (48) which engages the seal shroud (50). The moment produced by the exhaust gas over this area above axis (36) is opposite in direction to that produced below axis (36) which corresponds to the projected area of flap portion (20b). This offsetting of moments reduces the overall nozzle flap air load moment.

On a typical engine, this pressure balancing feature reduces the air load moment and thus the required actuation force to only about 37 percent of the force required for the conventional arrangement shown in FIGS. 18 and 19. For example, the air load moment produced by the conventional flat flap design of FIG. 18 can reach 240,800 inch-pounds while the corresponding air load moment produced by the design of FIG. 20 is only 88,300 inch-pounds.

Figure 22:
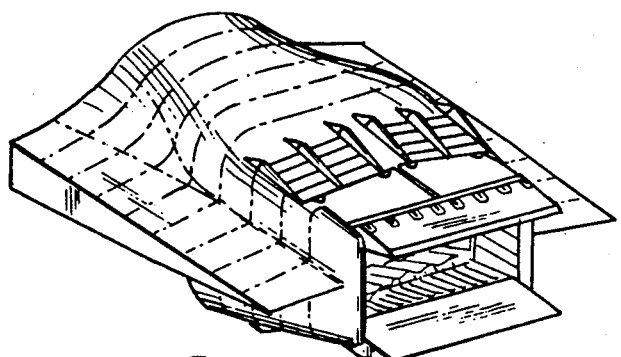
FIG. 22 is a perspective view of a prior art single engine two dimensional nozzle.
Figure 23:
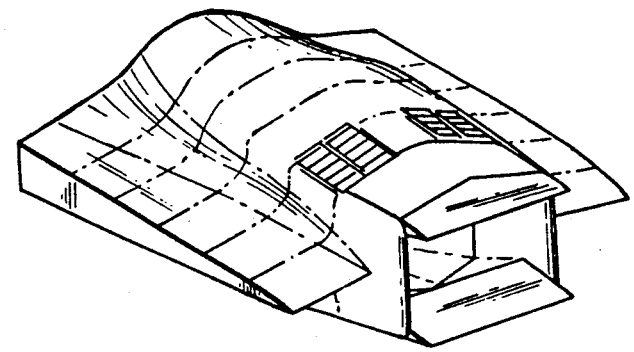
FIG. 23 is a perspective view of a single engine two dimensional nozzle according to the present invention.

While the characteristic rectangular cross section of a typical two dimensional nozzle can generally be smoothly integrated with the contours of a twin engine aircraft, this is not the case with single engine aircraft having generally circular fuselage cross sections. FIG. 22 shows the contour incompatability that results. By comparison, the two dimensional nozzle shown in FIG. 23 with its characteristic polygonalized external contour, blends more smoothly with the aircraft contours as can readily be seen by comparision of the two designs. This smooth contour blending of the exhaust nozzle with the aircraft envelope results in less drag and thus improves installed performance.

Figure 24:
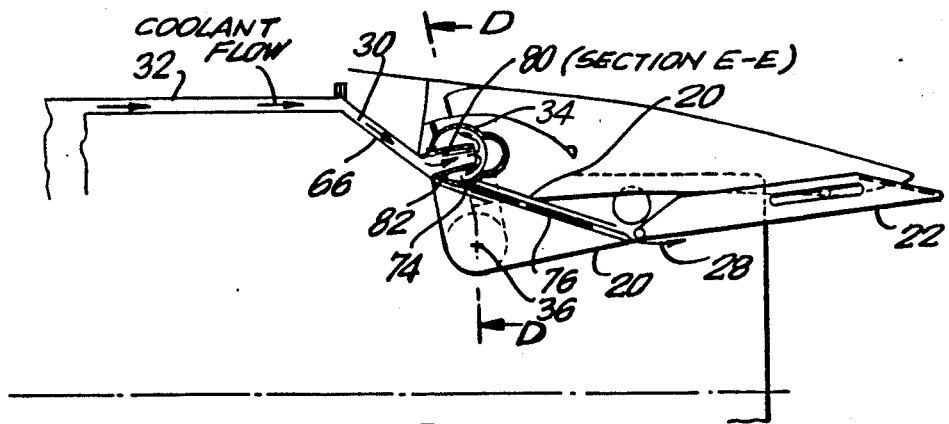
FIG. 24 is an axial sectional schematic view depicting an exhaust nozzle flap cooling system according to the present invention taken through line E—E of FIG. 25.

During reheat augmented operation, the open nozzle area is large as shown in FIGS. 9 and 24. In this position, the convergent flap (20) aligns well with the duct liner (66) so that conventional film cooling can be used. This involves injection of cooling air through slots in the duct liner to establish a film of reduced temperature air on its hot, inboard side, thus protecting the duct liner from excessive heat.

As the nozzle area is closed to positions such as nonaugmented cruise, (FIG. 10), and finally to the flow diverting position, (FIG. 11), the cooling air film injection slot (68) seen in FIG. 9 enlarges to a large gap which is inconsistent with film cooling. Reheat augmentation is not used in the nozzle configurations shown in FIGS. 9, 10 and 11 and thus, with the moderate turbine discharge temperatures of current engines, cooling of flaps may not be required and large gaps (68) as seen in FIGS. 10 and 11 are not a cooling detriment.

Figure 25:
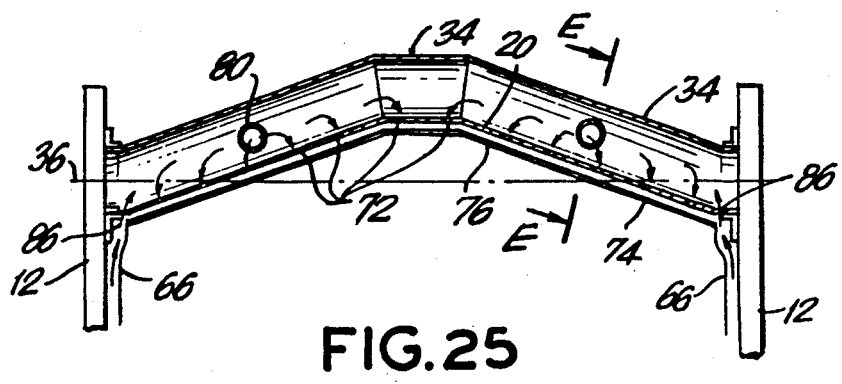
FIG. 25 is a sectional view taken through line D—D of FIG. 24.

On advanced engines with extreme turbine discharge temperatures, cooling can be required at all nozzle positions. As shown in FIGS. 24 and 25, the convergent flap (20) is provided with a cooling air supply at all flap positions through the flap shaft (34), which is hollow and serves as a coolant supply plenum. The coolant, as represented by the directional arrows, flows from the hollow flap shaft (34) through an array of orifices (72). The air coolant is thus distributed over the width of the convergent flap and flows into a gap (74) between a convergent flap liner (76) and convergent flap (20). The coolant finally discharges at the nozzle throat (28) to provide effective film cooling of the divergent flap (22).

Coolant is supplied to the plenum of shaft (34) from the annulus formed by the transition casing (30) and duct liner (66). Two or more coolant supply tubes (80) attached to the transition casing (30) deliver coolant to the plenum. Since the shaft-plenum (34) rotates about axis (36), there is sliding between the coolant supply tubes (80) and shaft-plenum (34). A seal (82) of conventional design is used to control leakage between the coolant supply tubes and the shaft plenum. Additionally, or alternately, coolant may be supplied to the shaft-plenum (34) from nozzle sidewall liner (66). In this case, the coolant enters the plenum through a number of close space orifices (86).

In summary, the two dimensional exhaust nozzle of the present invention provides many advantages relative to conventional axisymmetric nozzles including jet deflection for flight maneuverability and flow diverting capability for reverse thrust or lift thrust. Prior two dimensional nozzles have been much heavier than axisymmetric nozzles and have been excluded from a number of applications because of excessive weight. This two dimensional exhaust nozzle of the present invention with its low weight transition casing can significantly reduce this excessive weight and can at the same time reduce flap actuation force requirements and improve installation contour compatibility for single engine aircraft.

There has been disclosed heretofore the best embodiment of the invention presently contemplated. However, it is to be understood that various changes and modifications may be made thereto without departing from the spirit of the invention. For example, the contoured convergent flap (20) is shown as a three-sided member, but it could also be formed with a circular or clam shell contour or any contour with a geometry which mates with the seal shroud (50). Moreover, the contoured convergent flaps (20) can also be used with non-flow diverting nozzle designs which do not provide thrust reversing capabilities. If a nozzle does not include a thrust reverser, the convergent and divergent sections of the nozzle may be axially shortened since the exhaust flowpath need not be blocked, i.e. reduced to zero throat. Accordingly, these shortened sections will experience less force and lower bending moments and therefore may be designed with thinner sections and lower weight.

What is claimed is:

1. A two dimensional convergent-divergent nozzle for use with a turbojet engine, said nozzle symmetric in two perpendicular planes about a nozzle centerline and comprising convergent flap means for converting axisymmetric exhaust gas flow from said engine to substantially two dimensional flow within said nozzle.

2. A convergent flap assembly for use in a variable area exhaust nozzle having a nozzle throat with a substantially rectangular section, comprising:
a three-sided scoop-shaped non-planar convergent flap; and
a flap shaft connected to said convergent flap for pivotally mounting said convergent flap to the exhaust nozzle about a pivot axis.

3. A convergent flap assembly for use in a variable area exhaust nozzle having a nozzle throat with a substantially rectangular section, comprising:
a non-planar convergent flap; and
a flap shaft connected to said convergent flap for pivotally mounting said convergent flap to the exhaust nozzle about a pivot axis, wherein said flap shaft comprises a non-linear flap shaft having a central arched portion offset from said pivot axis.

4. A convergent flap assembly for use in a variable area exhaust nozzle having a nozzle throat with a substantially rectangular section, comprising:
a non-planar convergent flap;
a flap shaft connected to said convergent flap for pivotally mounting said convergent flap to the exhaust nozzle about a pivot axis; and
wherein said non-planar convergent flap has an outer portion extending outwardly of said pivot axis and an inner portion extending inwardly of said pivot axis.

5. A variable area multifunction exhaust nozzle for use with a cylindrical turbojet engine casing, said exhaust nozzle defining an internal exhaust gas flow path which is symmetric in two perpendicular planes about a nozzle centerline and changes in section from a circular section adjacent said engine casing to a rectangular section defining a nozzle throat, and wherein said rectangular section is first defined adjacent said nozzle throat.

6. A variable area multifunction exhaust nozzle for use with a cylindrical turbojet engine casing, said exhaust nozzle defining an internal exhaust gas flow path which changes in section from a circular section adjacent said engine casing to a rectangular section defining a nozzle throat, wherein said rectangular section is first defined adjacent said nozzle throat and a transition section having a cylindrical forward portion defining said circular section and a non-rectangular aft portion.

7. The exhaust nozzle of claim 6, further comprising a pair of contoured convergent flaps operatively associated with said transition casing, said flaps defining a non-rectangular flow path section adjacent said non-rectangular aft portion of said transition casing.

8. The exhaust nozzle of claim 7, further comprising a pair of shafts pivotally supporting said pair of contoured convergent flap shafts within said exhaust nozzle.

9. The exhaust nozzle of claim 7, wherein each one of said pair of contoured convergent flaps is contoured in the form of a scoop.

10. The exhaust nozzle of claim 8, wherein each one of said pair of shafts comprises a nonlinear shaft.

11. The exhaust nozzle of claim 8, wherein each one of said pair of shafts defines a pivot axis and wherein each one of said pair of contoured convergent flaps comprises an outer portion extending outwardly of said pivot axis and an inner portion extending inwardly of said pivot axis.

12. A variable area multifunction exhaust nozzle having a rectangular section nozzle throat for diverting exhaust gasses from a cylindrical turbojet engine casing, said nozzle comprising:
a transition casing having a cylindrical forward portion for connection with said engine casing and further having a non-rectangular aft portion, said transition casing defining a circular flow path section through said forward portion and a non-rectangular flow path section through said aft portion; and
a pair of contoured convergent flaps operatively associated with said transition casing, said pair of flaps defining a non-rectangular flow path section adjacent said aft portion of said transition casing and further defining a rectangular flow path section adjacent said nozzle throat such that a gradual flow path transition takes place from said circular flow path section to said rectangular flow path section.

13. The exhaust nozzle of claim 12, further comprising a pair of flap shafts respectively connected to said pair of contoured convergent flaps, said exhaust nozzle comprising a pair of opposed sidewalls located on opposite sides of each one of said pair of contoured convergent flaps and wherein each one of said pair of contoured convergent flaps is respectively pivotally connected to said sidewalls via one of said pair of flap shafts.

14. The exhaust nozzle of claim 13, wherein each one of said pair of contoured convergent flaps is mounted on one of said pair of flap shafts such that exhaust gasses flowing through said exhaust nozzle impact said pair of contoured convergent flaps so as to produce counteracting moments about each one of said pair of flap shafts.

15. The exhaust nozzle of claim 12, further comprising a pair of contoured seal shrouds operatively associated with said exhaust nozzle and a pair of leakage control seals operatively associated with said pair of contoured convergent flaps and said leakage control seals for sealing against loss of said exhaust gasses between said transition casing and said pair of contoured convergent flaps.

16. The exhaust nozzle of claim 15 wherein each one of said pair of leakage control seals is formed of a carbon composite material.

17. The exhaust nozzle of claim 13, wherein each one of said pair of flap shafts is formed as a hollow tubular plenum and wherein a coolant is respectively distributed over said pair of contoured convergent flaps through said hollow tubular plenum.

18. A variable area multifunction exhaust nozzle for use with a cylindrical turbojet engine casing, said exhaust nozzle defining an internal exhaust gas flow path which undergoes a transition from a circular section adjacent said engine casing to a rectangular section adjacent a nozzle throat area, the improvement comprising a contoured transition casing connected to said engine casing and a pair of contoured convergent flaps operatively associated with said transition casing such that said flow path transition from said circular section to said rectangular section takes place partly within said transition casing and partly within said pair of contoured convergent flaps.

* * * * *

UNITED STATES PATENT AND TRADEMARK OFFICE
CERTIFICATE OF CORRECTION

| | | |
|---|---|---|
| PATENT NO. | : | 5,016,818 |
| DATED | : | May 21, 1991 |
| INVENTOR(S) | : | Dudley O. Nash and David A. Nold |

It is certified that error appears in the above-identified patent and that said Letters Patent is hereby corrected as shown below:

Column 1, after Title, insert paragraph:

--The Government has rights in this invention pursuant to Contract No. F33657-83C-0281 awarded by the Department of The Air Force.--

Signed and Sealed this

First Day of December, 1992

Attest:

DOUGLAS B. COMER

Attesting Officer

Acting Commissioner of Patents and Trademarks